Jan. 11, 1927.
L. A. REINER
1,614,084
TRANSMISSION BAND
Filed August 27, 1925    2 Sheets-Sheet 1
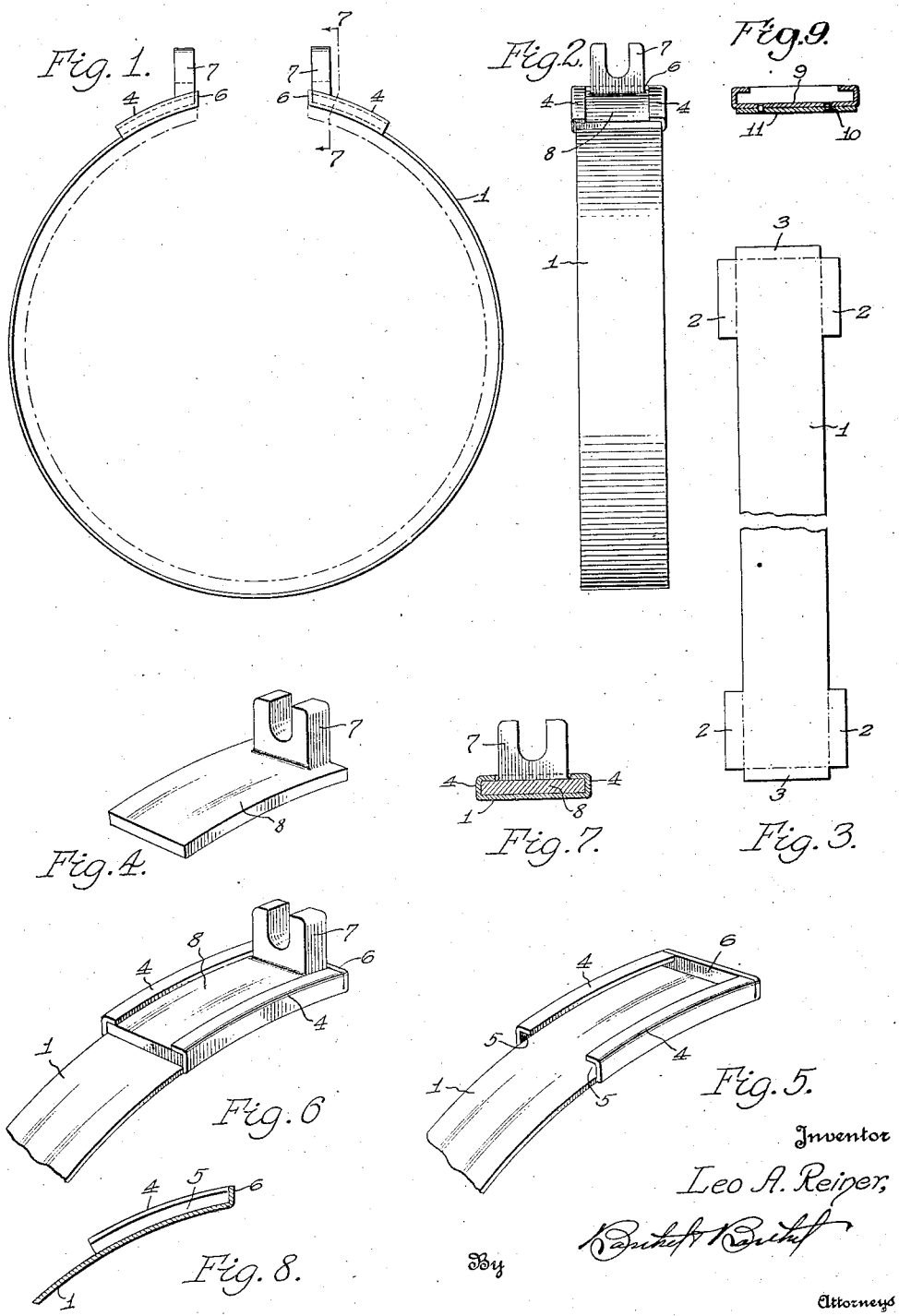

Jan. 11, 1927.
L. A. REINER
TRANSMISSION BAND
Filed August 27, 1925     2 Sheets-Sheet 2
1,614,084
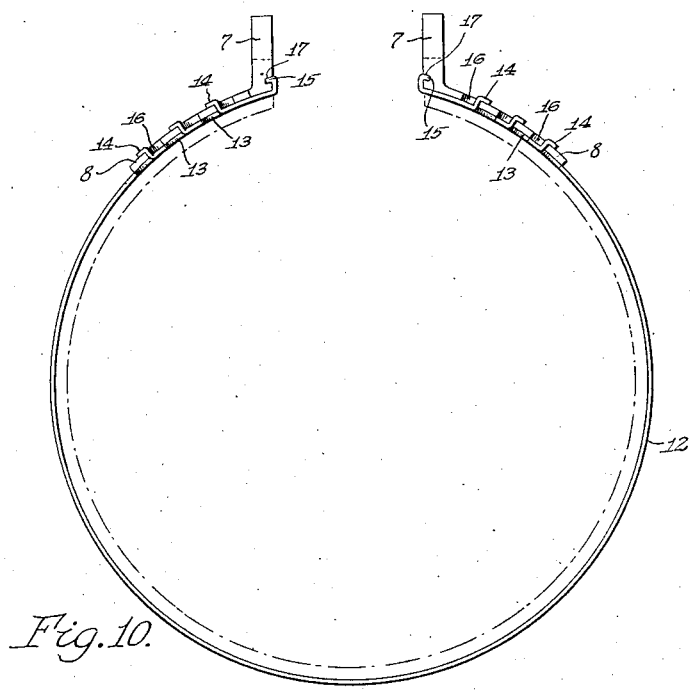
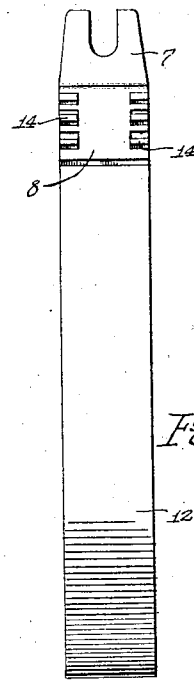
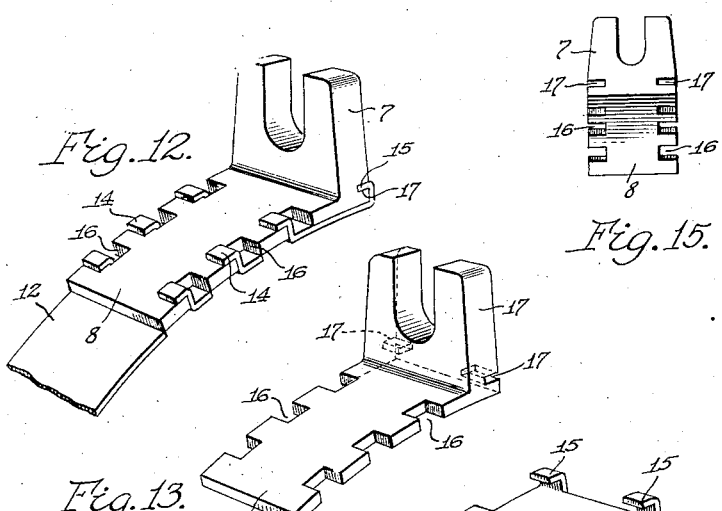
Inventor
Leo. A. Reiner,
By
Attorneys Patented Jan. 11, 1927.

1,614,084

UNITED STATES PATENT OFFICE.

LEO A. REINER, OF DETROIT, MICHIGAN.

TRANSMISSION BAND.

Application filed August 27, 1925. Serial No. 52,771.

This invention relates to bands for planetary transmissions, brake drums and other structures wherein a split band encircles a rotatable member and means are employed for actuating the band into and out of clutching engagement with the rotatable member. For example, the planetary transmission of a well known type of automobile includes a brake band encircling a brake drum in a housing, and the ends of the brake band are provided with ears associated with an adjusting mechanism by which the brake band may be actuated. Since brake bands are often relined or renewed such operations will be facilitated by detachable ears, and my invention aims to provide simple and effective means for detachably connecting ears to the ends of a brake band.

In one form of my invention separate housings are formed and attached to the ends of a band so that slotted or apertured ears may be detachably mounted in the housings.

In another form of my invention the ends of a brake band are fashioned to afford integral housings in which the ears are detachably mounted.

A further form of my invention includes a brake band having its ends provided with outstruck lugs and ears for anchoring portions adapted to be held by the band lugs.

All forms of my invention will be hereinafter specifically described and then claimed and reference will now be had to the drawings, wherein—

Figure 1 is a side elevation of a brake band provided with detachable ears;

Fig. 2 is a front elevation of the same;

Fig. 3 is a plan of a portion of a blank from which a band may be formed;

Fig. 4 is a perspective view of a detached ear;

Fig. 5 is a perspective view of one end of a band having integral housing;

Fig. 6 is a similar view showing an ear in the band housing;

Fig. 7 is a cross sectional view taken on the line 7—7 of Fig. 1;

Fig. 8 is a longitudinal sectional view of the housing;

Fig. 9 is a cross sectional view of a housing that may be attached to the end of a brake band;

Fig. 10 is a side elevation of a brake band having ears held by outstruck lugs of the band;

Fig. 11 is a front elevation of the same;

Fig. 12 is a perspective view of one end of the brake band provided with an ear;

Fig. 13 is a perspective view of a detached ear;

Fig. 14 is a similar view of one end of the brake band;

Fig. 15 is an end view of the detached ear, and

Fig. 16 is a plan of a portion of the brake band showing the manner in which the band is cut for the formation of lugs.

In the drawing, the reference numeral 1 denotes a band blank having each end thereof formed with lateral extensions 2 and an end extension 3. The lateral extensions 2 are adapted to be bent to provide channel side flanges 4 having confronting channels 5 and the outer ends of said channels are adapted to be closed by the end extension 3 which is bent to form an end flange or abutment 6, thus forming a housing on the end of the band.

7 denotes a slotted or apertured ear carried by the end of a plate or blank or anchoring portion 8 which is adapted to slide into the housing until it abuts the end flange 6, as best shown in Figs. 1 and 6. The usual band adjusting mechanism, which I have deemed unnecessary to illustrate is adapted to retain the ears 7 in operative position relative to the ends of the band 1.

In some instances the housing 9 may be separately formed and riveted or otherwise connected, as at 10, to the end of a band 11 (see Fig. 9).

Reference will now be had to Figs. 10 to 16 inclusive wherein each end of a brake band 12 has its side edges cut, as at 13, and outstruck to provide angular lugs 14. There may be two or more of the lugs at each end of the brake band and all of the lugs project from the outer face of the band. On the end of the band, at the side edges thereof, are formed angular end lugs 15, best shown in Fig. 14.

The slotted or apertured ear 7 has its anchoring portion 8 formed with side notches 16 through which the angular lugs 14 of the brake band 12 are adapted to project and engage end walls of the notches 16. The ear 7 also has notches or recesses 17 to receive the lugs 15, and by an endwise movement the ear 7 and its anchoring portion 8 may be connected to the brake band 12.

From the foregoing it will be observed that the ears 7 are detachably held on the ends of the band and can be easily removed. While in the drawing there are illustrated the preferred embodiments of my invention, it is to be understood that the structural elements are susceptible to such variations and modifications as fall within the scope of the appended claims.

What I claim is:

1. The combination of a band having its ends formed with side lugs, and ears having side portions slidable under the lugs of said band, said lugs being outstruck from said band.

2. The combination of a band having side lugs, and ears having notched anchoring portions engaging the lugs of said band.

3. The combination of a band having side and end lugs, and ears on said band and provided with anchoring portions and notches to receive the side and end lugs of said band.

In testimony whereof I affix my signature.

LEO A. REINER.